United States Patent
Baek et al.

(10) Patent No.: US 8,976,962 B2
(45) Date of Patent: Mar. 10, 2015

(54) APPARATUS AND METHOD FOR GENERATING GROUP KEY USING STATUS OF WIRELESS CHANNEL

(75) Inventors: Seon-Yeob Baek, Daejeon (KR); Sang-Kyung Yoo, Daejeon (KR); Seok Ryu, Daejeon (KR); Sang-Han Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 285 days.

(21) Appl. No.: 13/602,231

(22) Filed: Sep. 3, 2012

(65) Prior Publication Data

US 2013/0163752 A1  Jun. 27, 2013

(30) Foreign Application Priority Data

Dec. 21, 2011  (KR) .................. 10-2011-0139506

(51) Int. Cl.
*H04L 12/24* (2006.01)
*H04L 7/02* (2006.01)

(52) U.S. Cl.
USPC ............................ 380/247; 380/270; 726/21

(58) Field of Classification Search
None
See application file for complete search history.

(56) References Cited

U.S. PATENT DOCUMENTS

| 2007/0058808 | A1 | 3/2007 | Rudolf et al. |
| 2007/0177729 | A1 | 8/2007 | Reznik et al. |
| 2011/0143757 | A1 | 6/2011 | Oh et al. |
| 2012/0281834 | A1 | 11/2012 | Reznik et al. |

FOREIGN PATENT DOCUMENTS

| KR | 10-2007-0096059 A | 10/2007 |
| KR | 10-2009-0032534 A | 4/2009 |
| KR | 10-2010-0082369 A | 7/2010 |
| KR | 10-2011-0067968 A | 6/2011 |
| WO | 2006/081122 A2 | 8/2006 |
| WO | 2009/061962 A2 | 5/2009 |

OTHER PUBLICATIONS

Performance Evaluation of Experimental 50-Mb/s Diffuse Infrared Wireless Link Using On-Off Keying with Decision-Feedback Equalization. Marsh et al. IEEE(19963).*
Fast and Scalable Secret Key Generation Exploiting Channel Phase Randomness in Wireless Networks. Wang et al. IEEE(2011).*
Qing Wang et al., "Fast and Scalable Secret Key Generation Exploiting Channel Phase Randomness in Wireless Networks," IEEE INFOCOM, 2011, pp. 1422-1430.
Qian Wang et al., "Fast and Scalable Secret Key Generation Exploiting Channel Phase Randomness in Wireless Networks," IEEE INFOCOM, 2011.

* cited by examiner

*Primary Examiner* — Venkat Perungavoor
(74) *Attorney, Agent, or Firm* — LRK Patent Law Firm

(57) ABSTRACT

An apparatus and method for generating a group key using the status of a wireless channel are provided. The apparatus includes a representative channel response selection unit for selecting a representative channel response signal from among pilot signals received from slave terminals. A key generation unit generates a group key based on a representative channel response value of the representative channel response signal. A hash value generation unit generates a hash value corresponding to the group key. A transmission pilot control unit adjusts power intensities of transmission pilots of the respective slave terminals using the channel response value of the representative channel response signal and channel response values and transmission power intensities of the slave terminals. A communication unit is individually connected to the slave terminals and configured to transmit pilot signals, power intensities of which have been adjusted, and the hash value to the slave terminals.

13 Claims, 7 Drawing Sheets

APPARATUS AND METHOD FOR GENERATING GROUP KEY USING STATUS OF WIRELESS CHANNEL

CROSS REFERENCE TO RELATED APPLICATION

This application claims the benefit of Korean Patent Application No. 10-2011-0139506, filed on Dec. 21, 2011, which is hereby incorporated by reference in its entirety into this application.

BACKGROUND OF THE INVENTION

1. Technical Field

The present invention relates generally to an apparatus and method for generating a group key using the status of a wireless channel and, more particularly, to an apparatus and method for generating a group key using the status of a wireless channel, in which a wireless communication terminal transmits a pilot signal by varying transmission power in a wireless network environment, thus generating a group key.

2. Description of the Related Art

A large number of encryption technologies have been applied to and used in wireless communication systems. However, these technologies are problematic because legal users depend on the fact that it is difficult for an eavesdropper to calculate keys rather than the fact that it is mathematically impossible for the eavesdropper to obtain keys. Further, as computational ability that can be used by eavesdroppers increases, the effect of such a technology decreases. Therefore, it is more profitable to construct encryption technology that provides absolute secrecy rather than being based on the assumption of computational difficulty.

Meanwhile, a centralized private key distribution scheme is not suitable for an ad-hoc network or a peer-to-peer network which is a new wireless communication environment. Since this wireless communication environment is not controlled by a central system, it is impossible to implement a centralized private key distribution scheme, and a new key generation scheme that replaces the above scheme is required.

In a wireless communication network, mutually related random sources for providing absolute secrecy can be obtained from wireless channel information. In particular, when a wireless communication system is implemented in a Time Division Duplex (TDD) manner, two users A and B between which a communication link has been established can respectively obtain the same wireless channel information for a specific period of time.

In contrast, an eavesdropper, the wireless link of which is not established with the users A and B will observe the status of a wireless channel having little correlation with the wireless channel of the users. This difference an be used to generate a perfect private key. The two users can generate a private key using pieces of wireless channel information observed at regular time intervals. Such a private key generation scheme is advantageous in that there is no need to distribute or generate a key at a central system because a subject for performing communication directly generates a key.

The above private key generation scheme using the wireless channel has been proposed as a scheme for generating a private key using a channel impulse response that is spontaneously generated in a communication link between users who perform wireless communication. Further, such a private key generation scheme using the wireless channel is limited to the generation of a private key between two terminals.

However, there also occurs the case where the use of a group key to be used by two or more terminals in common is required, which takes place depending on the properties of the transmission data.

SUMMARY OF THE INVENTION

Accordingly, the present invention has been made keeping in mind the above problems occurring in the prior art, and an object of the present invention is to provide an apparatus and method for generating a group key using the status of a wireless channel, which replace an existing computation-based wireless communication encryption scheme with a wireless channel-based encryption scheme that provides absolute secrecy, thus preventing an eavesdropper from extracting a group key because the eavesdropper cannot obtain information about a communication channel.

Another object of the present invention is to provide an apparatus and method for generating a group key using the status of a wireless channel, in which a central system does not distribute a private key because a private key is directly extracted from a wireless channel between terminals that are performing wireless communication.

A further object of the present invention is to provide an apparatus and method for generating a group key using the status of a wireless channel, in which a master terminal induces a plurality of terminals to receive a uniform channel impulse response by controlling pilot transmission power, thus enabling the plurality of terminals to generate the same group key.

In accordance with an aspect of the present invention to accomplish the above objects, them is provided an apparatus for generating a group key using a status of a wireless channel, including a representative channel response selection unit for selecting a representative channel response signal from among pilot signals received from slave terminals included in a wireless network group, a key generation unit for generating a group key based on a representative channel response value of the representative channel response signal selected by the representative channel response selection unit, a hash value generation unit for generating a hash value corresponding to the group key generated by the key generation unit by applying the group key to a hash algorithm, a transmission pilot control unit for adjusting power intensities of transmission pilots of the respective slave terminals using the channel response value of the representative channel response signal and channel response values and transmission power intensities of the respective slave terminals, and a communication unit individually connected to the slave terminals and configured to transmit pilot signals, power intensities of which have been adjusted by the transmission pilot control unit, and the hash value to the respective slave terminals.

Preferably, the representative channel response selection unit may select a pilot signal, a transmission power intensity of which is equal to or less than a preset maximum transmission intensity, as the representative channel response signal.

Preferably, the representative channel response selection unit may select a pilot signal, for which a ratio of the representative channel response value to a minimum channel response value among channel response values of the respective slave terminals is greater than a threshold, as the representative channel response signal.

Preferably, the transmission pilot control unit may adjust the power intensities of the transmission pilots of the respective slave terminals so that the power intensities individually have the representative channel response value.

Preferably, the transmission pilot control unit may determine whether hash values of the respective slave terminals are identical, based on pieces of hash value comparison information received from the respective slave terminals.

Preferably, the transmission pilot control unit may be configured to, if it is determined that the hash values of all the slave terminals are identical, determine to use the group key generated by the key generation unit as a group key of the corresponding wireless network group.

Preferably, the transmission pilot control unit may be configured to, if it is determined that the hash values of all the slave terminals are not identical, determine to regenerate the group key generated by the key generation unit.

Preferably, the communication unit may receive the pilot signals from the respective slave terminals via uplinks of Time Division Duplexing (TDD) frames and transmits the pilot signals, the power intensities of which have been adjusted by the transmission pilot control unit, and the hash value to the respective slave terminals, via downlinks of the TDD frames.

In accordance with another aspect of the present invention to accomplish the above objects, there is provided a method of generating a group key using a status of a wireless channel, including selecting a representative channel response signal from among pilot signals received from slave terminals included in a wireless network group, generating a group key based on a representative channel response value of the representative channel response signal selected at the selecting the representative channel response signal, generating a hash value corresponding to the group key, generated at the generating the group key, by applying the group key to a hash algorithm, adjusting power intensities of transmission pilots of the respective slave terminals using the channel response value of the representative channel response signal and channel response values and transmission power intensities of the respective slave terminals, and transmitting pilot signals, power intensities of which have been adjusted at the adjusting the power intensities, and the hash value to the respective slave terminals.

Preferably, the selecting the representative channel response signal may be configured to select a pilot signal, a transmission power intensity of which is equal to or less than a preset maximum transmission intensity, as the representative channel response signal.

Preferably, the selecting the representative channel response signal may be configured to select a pilot signal, for which a ratio of the representative channel response value to a minimum channel response value among channel response values of the respective slave terminals is greater than a threshold, as the representative channel response signal.

Preferably, the adjusting the power intensities may be configured to adjust the power intensities of the transmission pilots of the respective slave terminals so that the power intensities individually have the representative channel response value.

Preferably, the method may further include receiving pieces of hash value comparison information from the respective slave terminals, and determining whether the hash values of all the slave terminals are identical, based on the pieces of hash value comparison information from the respective slave terminals.

Preferably, the method may further include, if it is determined at the determining that the hash values of all the slave terminals are identical, determining to use the group key, generated at the generating the group key, as a group key of the corresponding wireless network group.

Preferably, the method may further include, if it is determined at the determining that the hash values of all the slave terminals are not identical, determining to regenerate the group key generated at the generating the group key.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the present invention will be described in detail below with reference to the accompanying drawings.

Figure 1:
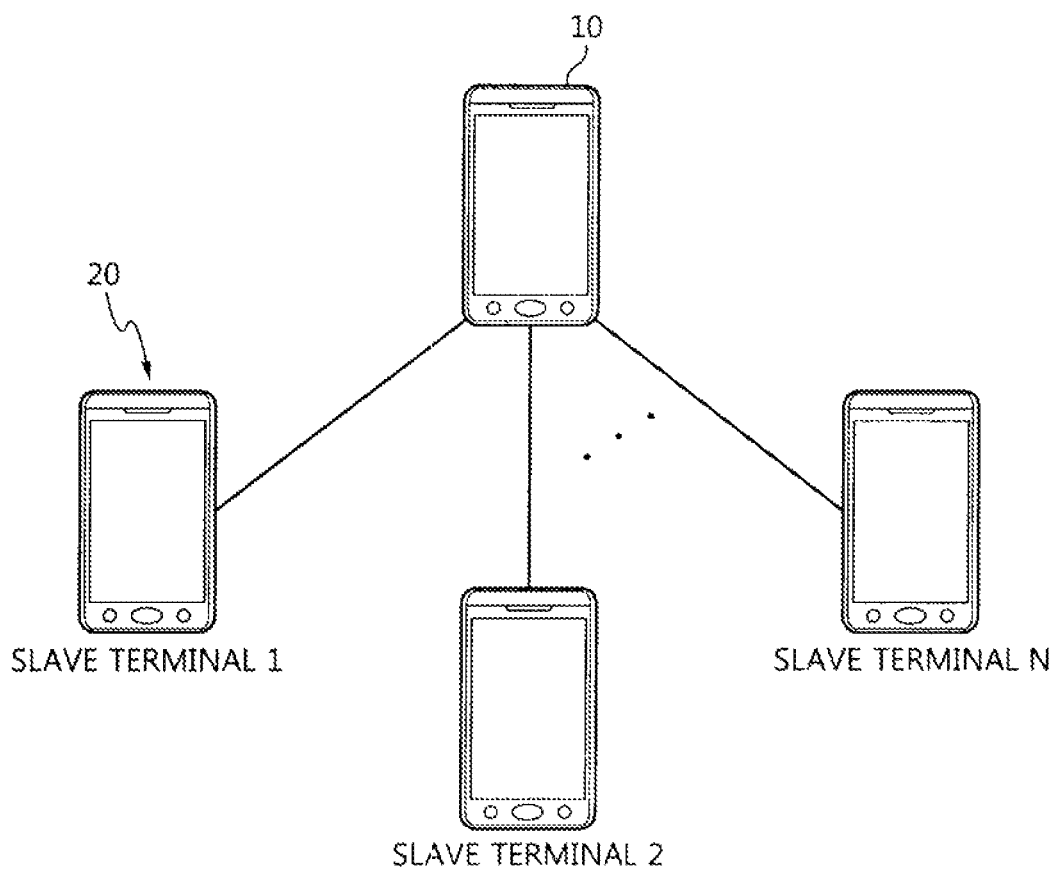
FIG. 1 is a diagram showing the configuration of a system to which an apparatus for generating a group key using the status of a wireless channel is applied according to the present invention.

FIG. 1 is a diagram showing the configuration of a system to which an apparatus for generating a group key using the status of a wireless channel is applied according to the present invention.

As shown in FIG. 1, a wireless network system applied to the present invention forms a wireless network group including two or more terminals. The wireless network group includes a single master terminal 10 and remaining slave terminals 20.

The terminals included in the wireless network group select a single master terminal 10 so as to generate a group key. In this case, the master terminal 10 controls transmission power intensity or phase within the wireless network group. The detailed configuration of the master terminal 10 will be described with reference to FIG. 2.

All of the remaining terminals other than the master terminal 10 in the wireless network group are slave terminals 20. The detailed configuration of each slave terminal 20 will be described with reference to FIG. 3.

Figure 2:
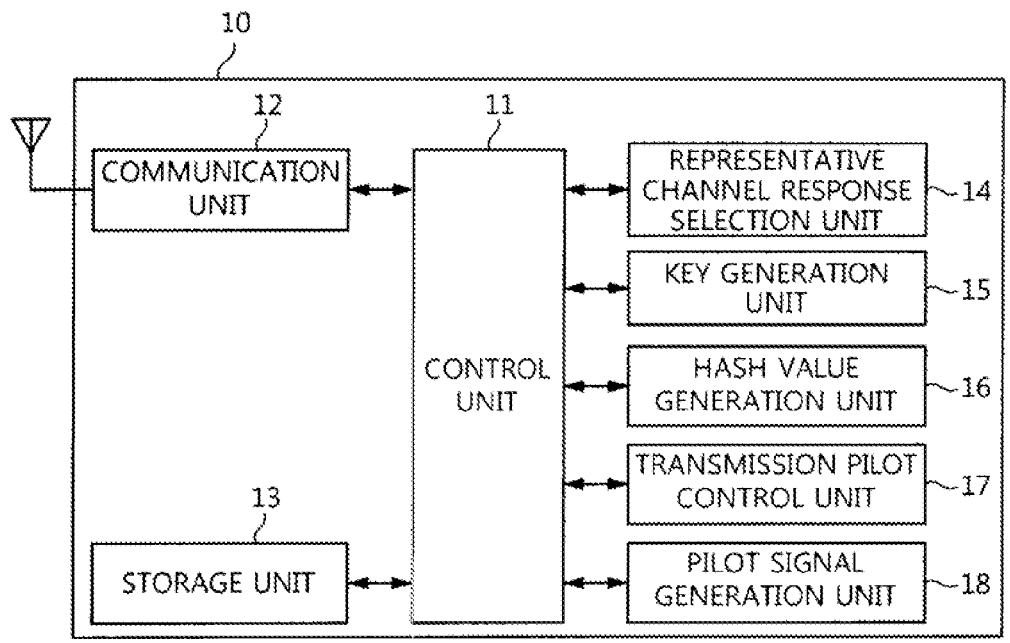
FIG. 2 is a block diagram showing the configuration of a master terminal applied to the present invention.

FIG. 2 is a block diagram showing the configuration of the master terminal applied to the present invention.

As shown in FIG. 2, the master terminal 10 according to the present invention includes a control unit 11, a communication unit 12, a storage unit 13, a representative channel response selection unit 14, a key generation unit 15, a hash value generation unit 16, a transmission pilot control unit 17, and a pilot signal generation unit 18.

Here, the control unit 11 controls the operations of individual units of the master terminal 10.

The communication unit 12 includes therein a switch. In this case, the communication unit 12 can be selectively operated in transmission mode or in reception mode by means of manipulating the internal switch. When the communication unit 12 is operated in transmission mode, it transmits pilot signals to the respective slave terminals via downlinks. When the communication unit 12 is operated in reception mode, it receives pilot signals from the respective slave terminals via uplinks. In this case, the communication unit 12 transmits and receives the pilot signals using previously allocated frequencies or times.

The communication unit 12 supports a communication interface for signal transmission/reception in the wireless network group. In particular, the communication unit 12 transmits and receives signals required to establish a group key to be used between the master terminal 10 and the slave terminals. In other words, the communication unit 12 receives pilots from the slave terminals and transmits pilots generated by the master terminal 10 to the respective slave terminals.

The storage unit 13 stores the transmission/reception data, set values, etc, of the master terminal 10. The storage unit 13 also stores the representative channel response value of the slave terminals required to establish a group key. Furthermore, the storage unit 13 stores channel response values, for which the transmission intensities or phases of pilots have been adjusted, for the respective slave terminals.

The representative channel response selection unit 14 selects a representative channel response from among the pilots of the respective slave terminals if the pilots have been received from the slave terminals via the communication unit 12.

In this case, the pilots received from the respective slave terminals are pilots, the transmission intensities or phases of which have been are fixed. The channel response values of the respective slave terminals are represented by the following Equation (1):

$$\overline{h_i} = h_{xi} \cos\theta + h_{yi} j \sin\theta \quad (1)$$

where i denotes the number of a slave terminal. Therefore, the representative channel response selection unit 14 selects a representative channel response by comparing the transmission intensities or phases of the pilots received from the respective slave terminals. The representative channel response value selected by the representative channel response selection unit 14 is represented by $\overline{h_p}$. The representative channel response selection unit 14 stores the representative channel response value of the pilot selected as the representative channel response in the storage unit 13.

In this case, the representative channel response selection unit 14 selects the representative channel response by taking into consideration the fixed transmission power intensity $P_{ref}$ of the slave terminals and the maximum transmission power intensity $P_{max}$ of the master terminal 10. The representative channel response value of the representative channel response signal selected by the representative channel response selection unit 14 must satisfy both the following conditions (1) and (2) for all the slave terminals;

$$\left|\frac{\overline{h_p}}{\overline{h_1}}\right| P_{ref} \leq P_{max} \quad \text{condition (1)}$$

$$\frac{|\overline{h_p}|}{\min|\overline{h_i}|} > \Gamma \quad \text{condition (2)}$$

In condition (2), $\Gamma$ denotes a threshold, and min denotes the minimum channel response value of channel response values of slave i.

In other words, for the representative channel response signal, the power transmission intensity thereof must be equal to or less than the maximum transmission intensity of the master terminal 10, as given in condition (1). Further, for the representative channel response signal, the ratio of the representative channel response value to the minimum channel response value must be greater than the threshold so as to guarantee the minimum signal reception intensity of a slave terminal having the minimum channel response value, as given in condition (2).

If there are several channel response signals satisfying the above conditions (1) and (2), the representative channel response selection unit 14 can select one from among the channel response signals. Meanwhile, the representative channel response selection unit 14 can also set a signal having a specific channel response value as the representative channel response signal.

Meanwhile, the key generation unit 15 generates a group key within the wireless network group.

In greater detail, the key generation unit 15 generates the group key based on the representative channel response value of the representative channel response signal selected by the representative channel response selection unit 14. In this case, the key generation unit 15 generates the group key by applying a designated quantization technique to the representative channel response value of the selected representative channel response signal.

The hash value generation unit 16 generates a hash value from the group key generated by the key generation unit 15. In this case, the hash value generation unit 16 generates the hash value corresponding to the group key using a previously designated hash algorithm. The hash value generated by the hash value generation unit 16 is transmitted to the individual slave terminals via data or control signal channels at the time at which each pilot signal is transferred to a corresponding slave terminal.

The transmission pilot control unit 17 adjusts the power intensities or the phases of transmission pilots depending on the channel responses of the respective slave terminals when the pilots are received from the slave terminals via the communication unit 12.

In this case, the transmission pilot control unit 17 adjusts the power intensities or phases of the transmission pilots of the respective slave terminals so that the power intensities or the phases have the representative channel response value.

In other words, the transmission pilot control unit 17 adjusts the power intensities or the phases of the transmission pilots of the respective slave terminals using the representative channel response value of the representative channel response signal, the channel response values of the respective slave terminals, and the fixed transmission power intensity information or phase information of the slave terminals.

For example, the transmission pilot control unit 17 adjusts the power intensities of the transmission pilots of the respective slave terminals to $$\left|\frac{\overline{h_p}}{\overline{h_1}}\right| P_{ref}.$$

The pilot signal generation unit 18 transmits transmission pilot signals based on the power intensities or phases of the transmission pilots adjusted by the transmission pilot control unit 17.

The control unit 11 transmits the transmission pilot signals generated by the pilot signal generation unit 18 to the respective slave terminals via the communication unit 12. In this case, the control unit 11 transmits both the transmission pilot signals generated by the pilot signal generation unit 18 and the hash value of the group key extracted by the hash value generation unit 16.

Meanwhile, the transmission pilot control unit 17 receives pieces of information about the comparison of hash values from the respective slave terminals. The transmission pilot control unit 17 determines whether the hash values transmitted to the respective slave terminals are identical, based on the pieces of hash value comparison information received from the respective slave terminals.

If the hash values of all the slave terminals are identical, the transmission pilot control unit 17 uses the group key generated by the key generation unit 15 as the actual group key. In contrast if the hash values of all the slave terminals are not identical, the transmission pilot control unit 17 determines to regenerate a group key.

The transmission pilot control unit 17 transmits information about the determination of whether to use the previously generated group key to the individual slave terminals via the communication unit 12. In this case, the communication unit 12 transmits the information about the determination of whether to use the group key to all the slave terminals over broadcast or multicast control signal channels.

Figure 3:
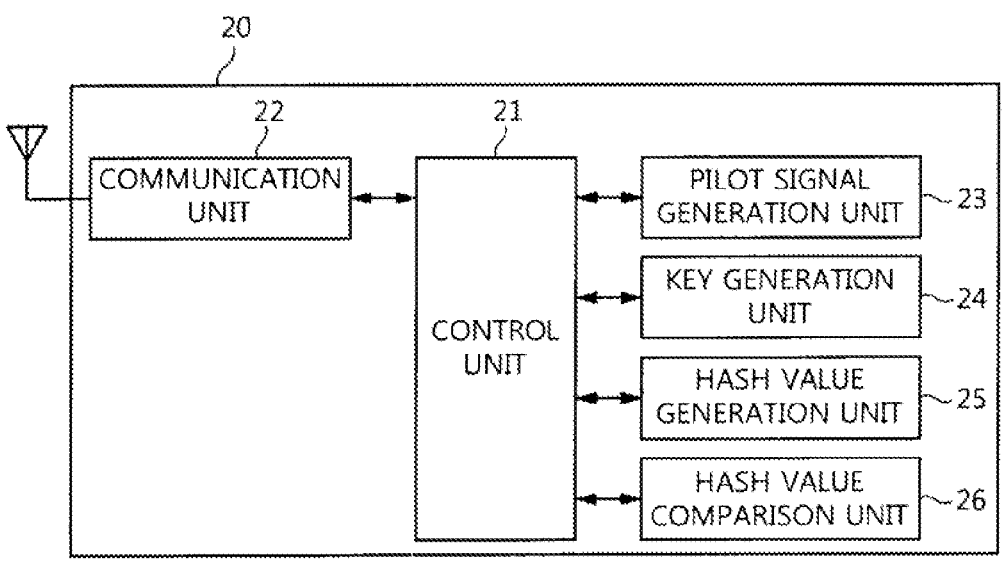
FIG. 3 is a block diagram showing the configuration of a slave terminal applied to the present invention.

FIG. 3 is a block diagram showing the configuration of a slave terminal applied to the present invention.

As shown in FIG. 3, the slave terminal 20 according to the present invention includes a control unit 21, a communication unit 22, a pilot signal generation unit 23, a key generation unit 24, a hash value generation unit 25, and a hash value comparison unit 26.

Here, the control unit 21 controls the operations of the individual units of the slave terminal 20.

The communication unit 22 includes therein a switch. In this ease, the communication unit 22 can be selectively operated in either of transmission mode and reception mode by means of manipulating the internal switch. When operating in transmission mode, the communication unit 22 transmits a pilot signal to the master terminal via an uplink, whereas when operating in reception mode, the communication unit 22 receives a pilot signal from the master terminal via a downlink. In this case, the communication unit 22 transmits and receives pilot signals using previously allocated frequencies or times.

The communication unit 22 supports a communication interface for signal transmission/reception within a wireless network group. In particular, the communication unit 22 transmits and receives signals required to establish a group key to be used between the master terminal and the slave terminal 20. In other words, the communication unit 22 receives a pilot generated by the master terminal, and transmits a pilot generated by the corresponding slave terminal 20 to the master terminal.

The pilot signal generation unit 23 of the slave terminal 20 generates a pilot signal required to generate a group key required for signal transmission/reception within the wireless network group. In this case, the pilot signal generation unit 23 generates a pilot signal having a fixed transmission power intensity or phase. The pilot signal generated by the pilot signal generation unit 23 is transmitted to the master terminal via the communication unit 22.

Meanwhile, the communication unit 22 receives a pilot signal, the transmission intensity or phase of which has been adjusted by the master terminal, and a hash value. In this case, the key generation unit 24 generates a group key based on the channel response value of the pilot signal received from the master terminal via the communication unit 22. In this case, the key generation unit 24 generates the group key by applying a designated quantization technique to the representative channel response value of a selected representative channel response signal.

The hash value generation unit 25 generates a hash value from the group key generated by the key generation unit 24. In this case, the hash value generation unit 25 generates a hash value corresponding to the group key using a previously designated hash algorithm.

The hash value comparison unit 26 compares the hash value generated by the hash value generation unit 25 with the hash value received from the master terminal via the communication unit 22. In this case, the hash value comparison unit 26 determines whether the hash value generated by the hash value generation unit 25 is identical to the hash value received from the master terminal via the communication unit 22.

Here, the control unit 21 transmits information, indicating whether the hash values are identical to each other, to the master terminal via the communication unit 22, based on the results of the determination by the hash value comparison unit 26. The communication unit 22 transmits the information, indicating whether the hash values are identical to each other, to the master terminal over a data or control signal channel.

Meanwhile, when the information about the determination of whether to use the group key is received from the master terminal, the control unit 21 uses the group key or retransmits a pilot signal to the master terminal in response to the received determination information.

As an example, if the master terminal has determined to use the previously generated group key, the control unit 21 uses the group key generated by the key generation unit 24 as the group key of the corresponding wireless network group. In contrast, if the master terminal has determined to regenerate a group key, the control unit 21 regenerates a pilot signal by controlling the pilot signal generation unit 23, and retransmits the regenerated pilot signal to the master terminal via the communication unit 22.

Figure 4:
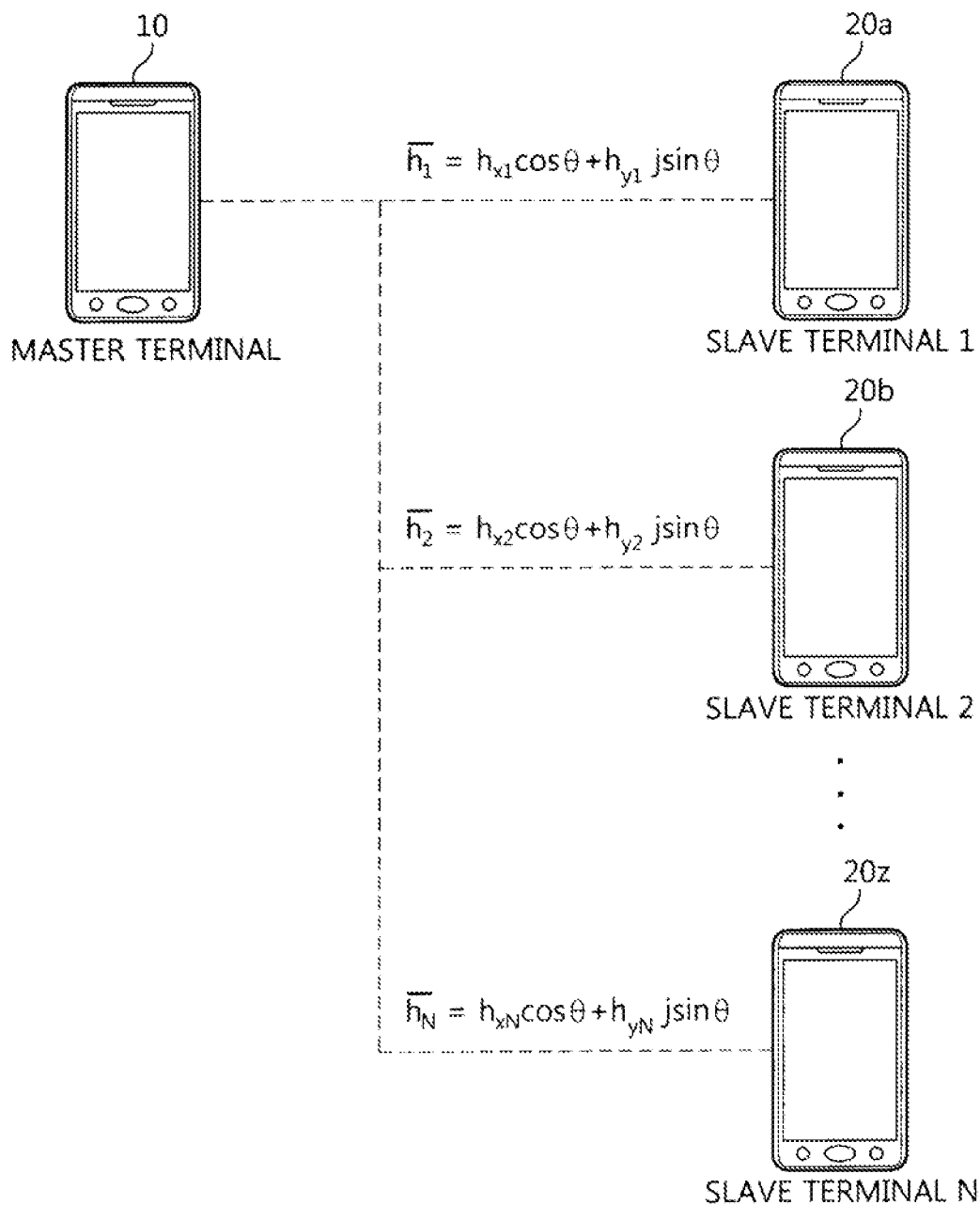
FIG. 4 is a reference diagram illustrating an embodiment of an apparatus for generating a group key using the status of a wireless channel according to the present invention.

FIG. 4 is a reference diagram illustrating an embodiment of an apparatus for generating a group key using the status of a wireless channel according to the present invention.

As shown in FIG. 4, a wireless network group applied to the present invention includes a single master terminal 10 and N slave terminals 20*a*, 20*b*, . . . , 20*z*.

The pilot signals transmitted between the master terminal 10 and the N slave terminals 20*a*, 20*b*, . . . , 20*z* have different wireless channel response values. In other words, the master terminal 10 and the slave terminal 1 20*a* have a wireless channel response value of $\overline{h_1} = h_{x1} \cos\theta + h_{y1} j \sin\theta$. Further, the master terminal 10 and the slave terminal 2 20*b* have a wireless channel response value of $\overline{h_2} = h_{x2} \cos\theta + h_{y2} j \sin\theta$.

In this way, the master terminal 10 and the slave terminal N 20*z* have a wireless channel response value of $\overline{h_N} = h_{xN} \cos\theta + h_{yN} j \sin\theta$.

Figure 5:
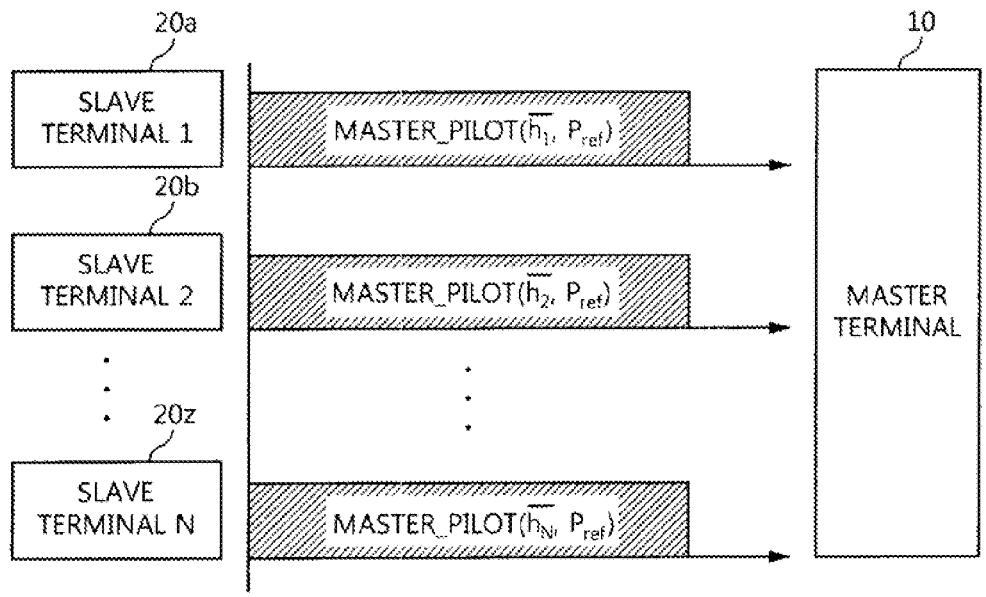
FIGS. 5 and 6 are reference diagrams illustrating another embodiment of an apparatus for generating a group key using the status of a wireless channel according to the present invention.
Figure 6:
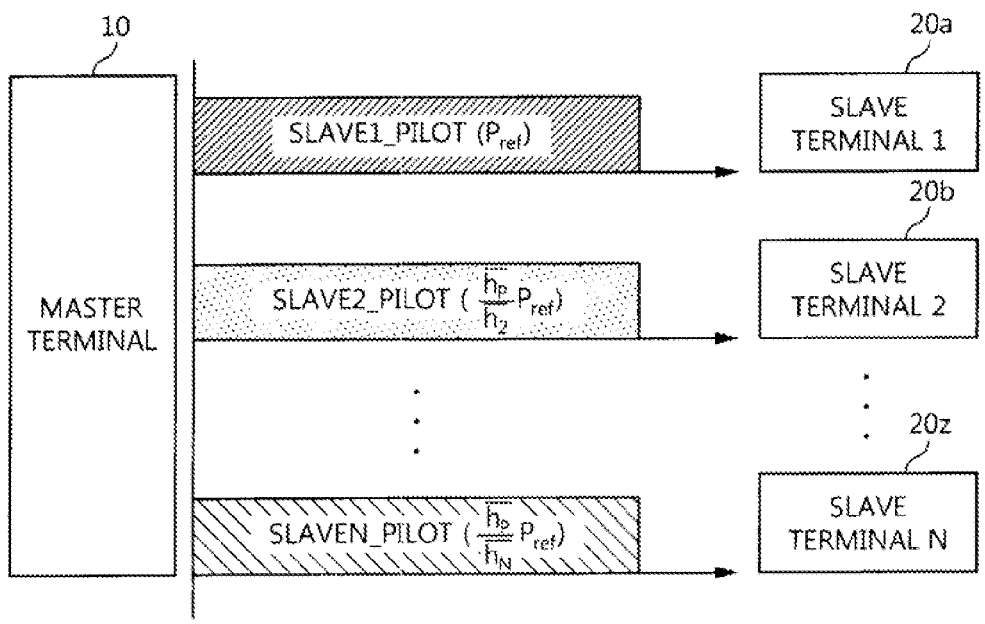

FIGS. 5 and 6 are reference diagrams illustrating another embodiment of an apparatus for generating a group key using the status of a wireless channel according to the present invention. In greater detail, FIGS. 5 and 6 illustrate the structures of frames transmitted and received between the master terminal and slave terminals.

The wireless network system applied to the present invention performs communication in Time Division Duplexing (TDD) mode or similar mode. In the present invention, an example to which TDD mode is applied will be described below. TDD frames are classified into TDD frames for an uplink and TDD frames for a downlink.

First, FIG. 5 is a diagram showing the structure of a TDD frame for an uplink transmitted by each slave terminal to the master terminal.

In other words, as shown in FIG. 5, the slave terminals 20a, 20b, . . . , 20z transmit pilot signals to the master terminal 10 via uplinks. In this case, the slave terminals 20a, 20b, . . . , 20z transmit the pilot signals with a fixed transmission power intensity or phase using designated wireless resources.

As an example, the transmission power intensities of the slave terminal 1 20a, the slave terminal 2 20b, . . . , the slave terminal N 20z have the fixed value of $P_{ref}$.

Meanwhile, the pilot signal transmitted by each slave terminal 20a, 20b, . . . , 20z has the channel response value shown in FIG. 4. That is, a master_pilot transmitted by the slave terminal 1 20a has a channel response value of $\overline{h_1}$, a master_pilot transmitted by the slave terminal 2 20b has a channel response value of $\overline{h_2}$, and a master_pilot transmitted by the slave terminal N 20z in this way has a channel response value of a $\overline{h_N}$.

Meanwhile, FIG. 6 illustrates the structure of a TDD lime for a downlink transmitted by the master terminal to each slave terminal.

The master terminal 10 adjusts the intensities of the transmission power of downlinks based on the channel response values of respective pilot signals received via the uplinks of FIG. 5.

As an example, the master terminal 10 sets the channel response value $\overline{h_1}$ of a pilot signal received from the slave terminal 1 20a as a representative channel response value $\overline{h_p}$, and adjusts the intensities of transmission power of the remaining slave terminals 2 20b, . . . , N 20z, using both the representative channel response value $\overline{h_p}$ and the fixed transmission power intensity $P_{ref}$.

In this case, since the master terminal 10 sets the pilot signal of the slave terminal 1 20a as the representative channel response signal, the master terminal 10 maintains the transmission power intensity of the pilot signal transmitted to the slave terminal 1 20a at the fixed transmission power intensity $P_{ref}$, and adjusts the transmission power intensity of the pilot signal transmitted to the slave terminal 2 20b to $$\frac{\overline{h_p}}{\overline{h_2}} P_{ref}.$$

In this way, the master terminal 10 adjusts the transmission power intensity of the pilot signal transmitted to the slave terminal N 20z to $$\frac{\overline{h_p}}{\overline{h_N}} P_{ref}.$$

Therefore, as described above, the master terminal 10 transmits the pilot signals, the transmission power intensities of which have been adjusted for the slave terminals 20a, 20b, . . . , 20z, that is, slave1_pilot, slave2_pilot, . . . , slaveN_pilot, to the respective slave terminals 20a, 20b, . . . , 20z via the downlinks.

Frames other than pilot channels of uplinks and downlinks shown in FIGS. 5 and 6 are used to transmit data or other control signals.

Here, the pilot channels of uplinks and downlinks are allocated only when it is required to generate the group key of a relevant group. When the generation of the group key is not required, the allocated wireless resources can be changed to data or control signal channels.

Figure 7:
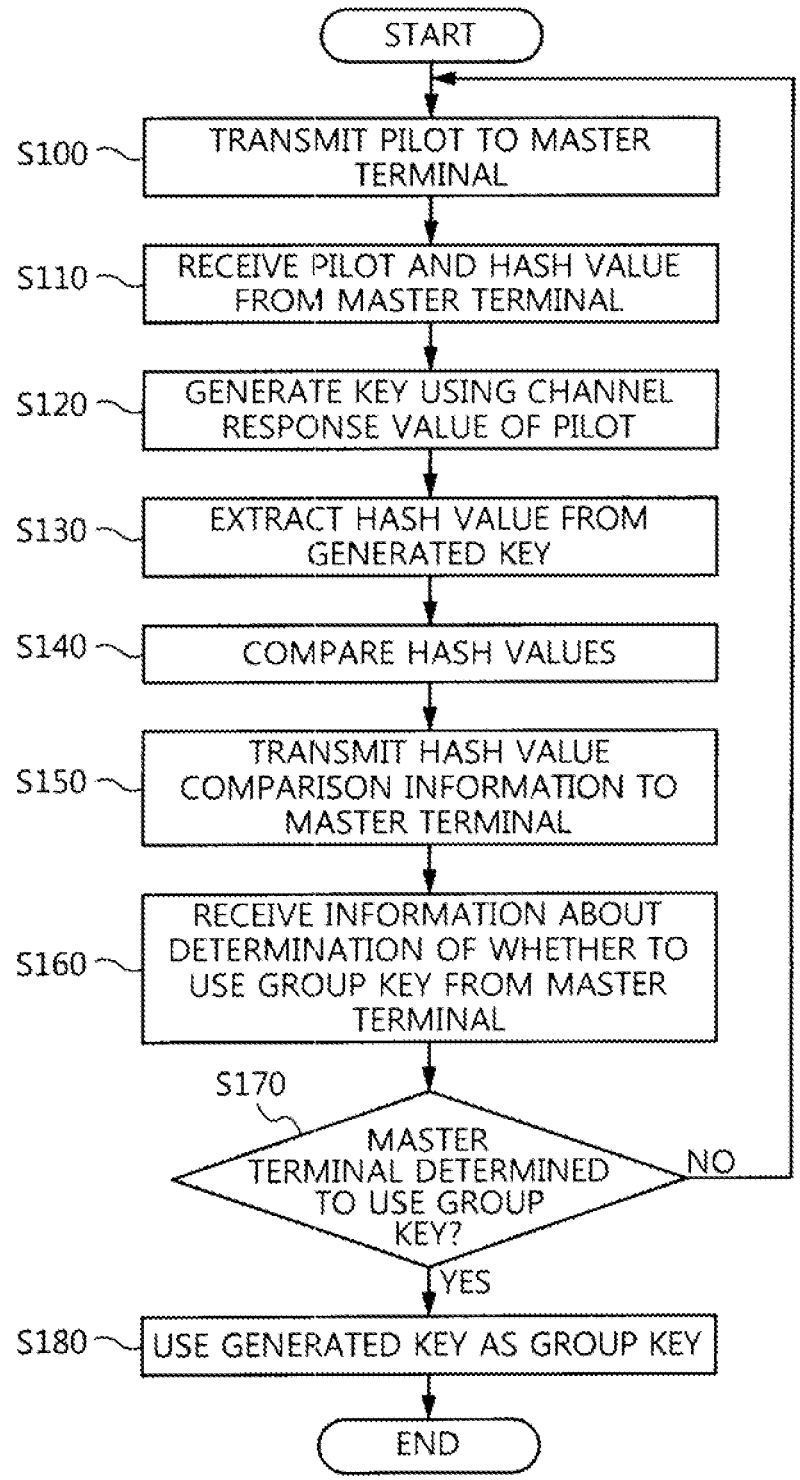
FIG. 7 is a flowchart showing the operating flow of the slave terminal applied to the present invention.

FIG. 7 is a flowchart showing the operating flow of a slave terminal applied to present invention.

A process for generating a group key in a wireless network system applied to the present invention starts at the operation of each slave terminal transmitting a pilot signal to a master terminal.

As shown in FIG. 7, the slave terminal transmits a pilot signal to the master terminal using allocated wireless resources at step S100. The pilot signal transmitted to the master terminal at step S100 has a fixed transmission power intensity or phase.

Thereafter, the slave terminal receives a pilot signal and a hash value from the master terminal at step S110.

In this case, the slave terminal generates a key using the channel response value of the pilot signal received at step S110 at step S120, and extracts a hash value by applying the key generated at step S120 to a hash algorithm at step S130.

The slave terminal compares the hash value, received from the master terminal at step S110, with the hash value, extracted at step S130, at step S140. In this case, the slave terminal transmits information about the comparison of the hash values at step S140 to the master terminal at step S150.

Meanwhile, the slave terminal receives information about the determination of whether to use a group key from the master terminal on the basis of the hash value comparison information at step S150, at step S160.

In this case, if the master terminal has determined to use the group key at step S170, the slave terminal uses the key generated at step S120 as the group key at step S180. In contrast, if the master terminal has determined not to use the group key at step S170, the slave terminal performs the procedure ranging from steps S100 to S160 again.

Figure 8:
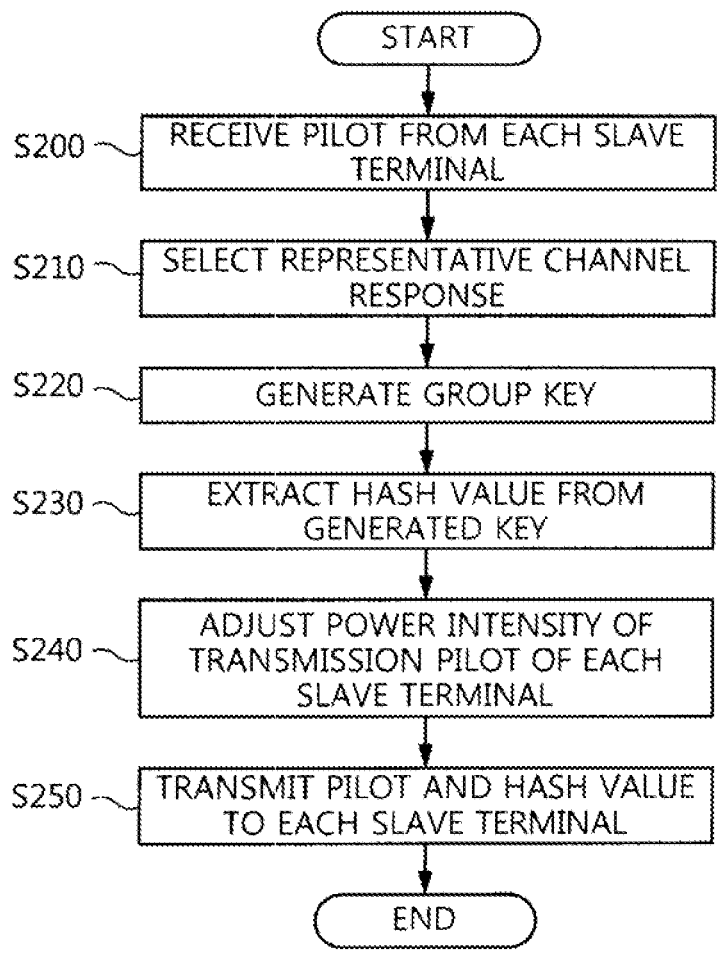
FIGS. 8 and 9 are flowcharts showing the operating flow of the master terminal plied to the present invention.
Figure 9:
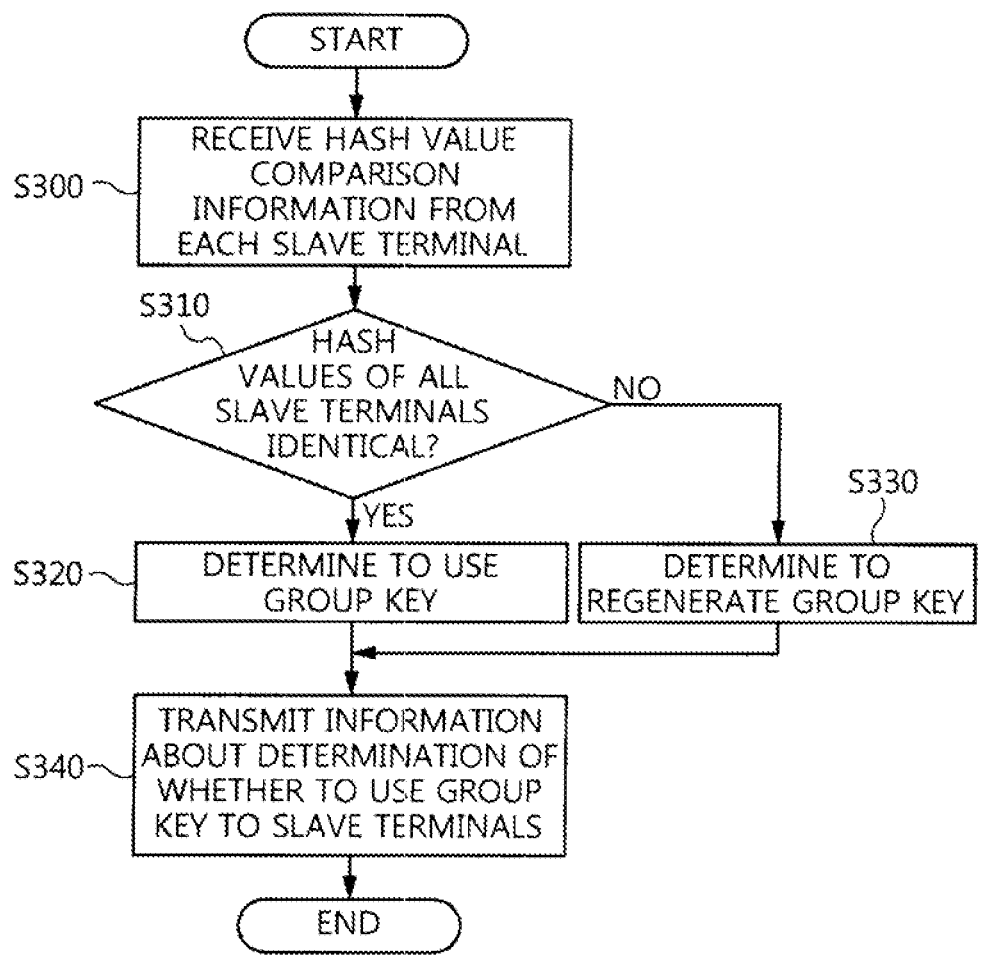

FIGS. 8 and 9 are flowcharts showing the operating flow of the master terminal applied to the present invention.

As shown in FIG. 8, the master terminal receives pilot signals from respective slave terminals so as to generate a group key within a wireless network group at step S200.

In this case, the master terminal selects a single representative channel response signal of any one of the pilot signals, received from the respective slave terminals at step S200, at step S210. As the criteria for the selection of the representative channel response signal, the description of the representative channel response selection unit of FIG. 2 can be referred to.

The master terminal generates a key using the channel response value of the representative channel response signal selected at step S210 at step S220, and extracts a hash value by applying the key generated at step S220 to a hash algorithm at step S230.

Meanwhile, the master terminal adjusts the transmission power intensities of the pilot signals that are transmitted to the respective slave terminals, based on the channel response values of the respective pilot signals received at step S200, at step S240. Of course, the phases of the pilot signals, other than the power intensities, can be adjusted. At step S240, the transmission power intensities of the pilot signals that are transmitted to the respective slave terminals are adjusted so that they individually have the representative channel response value.

Therefore, the master terminal transmits the pilot signals, the transmission power intensities of which have been adjusted at step S240, to the corresponding slave terminals, respectively. In this case, the master terminal transmits both the pilot signals and the hash value, extracted at step S230, at step S250.

Meanwhile, as shown in FIG. 9, the master terminal receives pieces of information about the comparison of hash values from the respective slave terminals, for the hash value transmitted at step S250 of FIG. 8, at step S300.

If it is determined by all the slave terminals included in the wireless network group that hash values are identical, based on the hash value comparison information received at step S300, at step S310, the master terminal determines to use the key generated at step S220 as the group key of the corresponding wireless network group at step S320, and transmits information about the determination of whether to use the group key to the individual slave terminals at step S340.

In contrast, if it is determined by at least one slave terminal included in the wireless network group that hash values are not identical, based on the hash value comparison information at step S300, at step S310, the master terminal determines to regenerate the group key of the corresponding wireless network group at step S330, and transmits information about the determination of whether to use the group key to the individual slave terminals at step S340.

If the master terminal determines to regenerate the group key of the corresponding wireless network group, the master terminal receives again pilot signals from the respective slave terminals. In this case, the master terminal repeatedly performs the procedures of FIGS. 8 and 9 until it finally determines to use the generated group key.

In the embodiments of the present invention, a description has been made such that the master terminal generates a group key and transmits a hash value to the individual slave terminals, and the slave terminals determine whether the hash values are identical. However, in the opposite situation, it is possible to apply a method in which slave terminals generate hash values for a group key and transmit the hash values to the master terminal and in which the master terminal determines whether the hash values are identical.

According to the present invention, there is an advantage in that in a wireless communication network, a group key shared by a plurality of terminals can be generated using wireless channel information.

Further, the present invention is advantageous in that since a centralized private key distribution scheme is not used, a group key can be efficiently generated using an ad-hoc network.

Furthermore, the present invention is advantageous in that a master terminal can control transmission power intensities or phases, so that slave terminals not only can easily generate the same group key, but also can simplify functions that must be implemented.

Furthermore, the present invention is advantageous in that a group key is generated from wireless channel information between terminals, so that it is difficult for eavesdroppers to obtain the generated group key.

As described above, although the apparatus and method for generating a group key using the status of a wireless channel according to the present invention have been described with reference to the illustrated drawings, the present invention is not limited by the embodiments and drawings disclosed in the present specification, and various modifications, additions and substitutions are possible, without departing from the scope and spirit of the invention.

What is claimed is:

1. An apparatus for generating a group key using a status of a wireless channel, comprising:
at least one hardware processor;
a representative channel response selection unit loaded on the at least one hardware processor for selecting a representative channel response signal from among pilot signals received from slave terminals included in a wireless network group;
a key generation unit loaded on the at least one hardware processor for generating a group key based on a representative channel response value of the representative channel response signal selected by the representative channel response selection unit;
a hash value generation unit loaded on the at least one hardware processor for generating a hash value corresponding to the group key generated by the key generation unit by applying the group key to a hash algorithm;
a transmission pilot control unit loaded on the at least one hardware processor for adjusting power intensities of transmission pilots of the respective slave terminals using the channel response value of the representative channel response signal and channel response values and transmission power intensities of the respective slave terminals; and
a communication unit loaded on the at least one hardware processor individually connected to the slave terminals and configured to transmit pilot signals, power intensities of which have been adjusted by the transmission pilot control unit, and the hash value to the respective slave terminals,
wherein the representative channel response selection unit selects a pilot signal, a transmission power intensity of which is equal to or less than a preset maximum transmission intensity, as the representative channel response signal, and
wherein the slave terminals includes a memory for storing the received pilot signals, the received power intensities, and the received hash value.

2. The apparatus of claim 1, wherein the representative channel response selection unit selects a pilot signal, for which a ratio of the representative channel response value to a minimum channel response value among channel response values of the respective slave terminals is greater than a threshold, as the representative channel response signal.

3. The apparatus of claim 1, wherein the transmission pilot control unit adjusts the power intensities of the transmission pilots of the respective slave terminals so that the power intensities individually have the representative channel response value.

4. The apparatus of claim 1, wherein the transmission pilot control unit determines whether hash values of the respective slave terminals are identical, based on pieces of hash value comparison information received from the respective slave terminals.

5. The apparatus of claim 4, wherein the transmission pilot control unit is configured to, if it is determined that the hash values of all the slave terminals are identical, determine to use the group key generated by the key generation unit as a group key of the corresponding wireless network group.

6. The apparatus of claim 4, wherein the transmission pilot control unit is configured to, if it is determined that the hash values of all the slave terminals are not identical, determine to regenerate the group key generated by the key generation unit.

7. The apparatus of claim 1, wherein the communication unit receives the pilot signals from the respective slave terminals via uplinks of Time Division Duplexing (TDD) frames and transmits the pilot signals, the power intensities of which have been adjusted by the transmission pilot control unit, and the hash value to the respective slave terminals, via downlinks of the TDD frames.

8. A computer-implemented method of generating a group key using a status of a wireless channel, comprising:
- selecting, by a representative channel response selection unit loaded on at least one hardware processor, a representative channel response signal from among pilot signals received from slave terminals included in a wireless network group;
- generating, by a key generation unit loaded on the at least one hardware processor, a group key based on a representative channel response value of the representative channel response signal selected at the selecting the representative channel response signal;
- generating, by a hash value generation unit loaded on at least one hardware processor, a hash value corresponding to the group key, generated at the generating the group key, by applying the group key to a hash algorithm;
- adjusting, by a transmission pilot control unit loaded on at least one hardware processor, power intensities of transmission pilots of the respective slave terminals using the channel response value of the representative channel response signal and channel response values and transmission power intensities of the respective slave terminals; and
- transmitting, by a communication unit loaded on at least one hardware processor, pilot signals, power intensities of which have been adjusted at the adjusting the power intensities, and the hash value to the respective slave terminals,
- wherein the selecting the representative channel response signal is configured to select a pilot signal, a transmission power intensity of which is equal to or less than a preset maximum transmission intensity, as the representative channel response signal, and
- wherein the slave terminals includes a memory for storing the received pilot signals, the received power intensities, and the received hash value.

9. The computer-implemented method of claim 8, wherein the selecting the representative channel response signal is configured to select a pilot signal, for which a ratio of the representative channel response value to a minimum channel response value among channel response values of the respective slave terminals is greater than a threshold, as the representative channel response signal.

10. The computer-implemented method of claim 8, wherein the adjusting the power intensities is configured to adjust the power intensities of the transmission pilots of the respective slave terminals so that the power intensities individually have the representative channel response value.

11. The computer-implemented method of claim 8, further comprising:
- receiving pieces of hash value comparison information from the respective slave terminals; and
- determining whether the hash values of all the slave terminals are identical, based on the pieces of hash value comparison information from the respective slave terminals.

12. The computer-implemented method of claim 11, further comprising:
- if it is determined at the determining that the hash values of all the slave terminals are identical, determining to use the group key, generated at the generating the group key, as, a group key of the corresponding wireless network group.

13. The computer-implemented method of claim 11, further comprising:
- if it is determined at the determining that the hash values of all the slave terminals are not identical, determining to regenerate the group key generated at the generating the group key.

* * * * *